United States Patent
Kwak et al.

(10) Patent No.: US 8,031,643 B2
(45) Date of Patent: Oct. 4, 2011

(54) METHOD AND APPARATUS FOR TRANSMITTING/RECEIVING ACK/NACK IN MOBILE COMMUNICATION SYSTEM

(75) Inventors: Yong-Jun Kwak, Yongin-si (KR); Joon-Young Cho, Suwon-si (KR); Ju-Ho Lee, Suwon-si (KR); Young-Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 842 days.

(21) Appl. No.: 11/972,164

(22) Filed: Jan. 10, 2008

(65) Prior Publication Data

US 2008/0170634 A1 Jul. 17, 2008

(30) Foreign Application Priority Data

Jan. 10, 2007 (KR) ........................ 10-2007-0003040

(51) Int. Cl.
*H04B 7/005* (2006.01)
(52) U.S. Cl. ..... 370/278; 370/329; 370/336; 455/452.1; 455/522
(58) Field of Classification Search .................. 370/278, 370/329, 336; 455/450, 452.1, 522
See application file for complete search history.

(56) References Cited

U.S. PATENT DOCUMENTS

| | | | | |
|---|---|---|---|---|
| 2003/0203737 | A1* | 10/2003 | Jarett | 455/450 |
| 2004/0179493 | A1 | 9/2004 | Khan | |
| 2004/0221218 | A1 | 11/2004 | Grob et al. | |
| 2007/0291702 | A1* | 12/2007 | Nanba et al. | 370/336 |
| 2008/0084844 | A1* | 4/2008 | Reznik et al. | 370/330 |
| 2008/0170634 | A1* | 7/2008 | Kwak et al. | 375/260 |

FOREIGN PATENT DOCUMENTS

| | | |
|---|---|---|
| KR | 1020000031129 | 6/2000 |
| KR | 1020040081060 | 9/2004 |
| KR | 1020050007980 | 1/2005 |

* cited by examiner

*Primary Examiner* — Luat Phung
(74) *Attorney, Agent, or Firm* — The Farrell Law Firm, P.C.

(57) ABSTRACT

Disclosed is a method and an apparatus for multiplexing and transmitting/receiving an ACK/NACK resulting from use of a HARQ scheme in an OFDMA system. Frequency and code multiplexing methods are combined with regard to the ACK/NACK to reduce signaling overhead. Frequency multiplexing is conducted by using the MCS level adopted by scheduling channels to improve the ACK/NACK transmitting performance, and code multiplexing is conducted to allocate ACK/NACK resources by using the index of the scheduling channels.

8 Claims, 11 Drawing Sheets

METHOD AND APPARATUS FOR TRANSMITTING/RECEIVING ACK/NACK IN MOBILE COMMUNICATION SYSTEM

PRIORITY

This application claims priority under 35 U.S.C. §119 (a) to an application entitled "Method and Apparatus for Transmitting/Receiving ACK/NACK in Mobile Communication System" filed with the Korean Intellectual Property Office on Jan. 10, 2007 and assigned Serial No. 2007-0003040, the contents of which are incorporated herein by reference.

BACKGROUND OF THE INVENTION

1. Field of the Invention

The present invention relates to a method and an apparatus for transmitting/receiving an ACK/NACK according to a method for multiplexing downlink control information and data in an OFDMA (Orthogonal Frequency Division Multiple Access) wireless communication system.

2. Description of the Related Art

In the field of mobile communication systems, the OFDM (Orthogonal Frequency Division Multiplexing) scheme has recently been studied widely as a scheme useful for high-speed data transmission through wireless channels.

The OFDM scheme employs multi-carriers to transmit data. Particularly, the OFDM is a type of multi-carrier modulation scheme, which converts serially inputted strings of symbols into parallel symbols, modulates the respective parallel symbols into a number of sub-carriers having orthogonality relative to one another, i.e. a number of sub-carrier channels, and transmits them.

Figure 1:
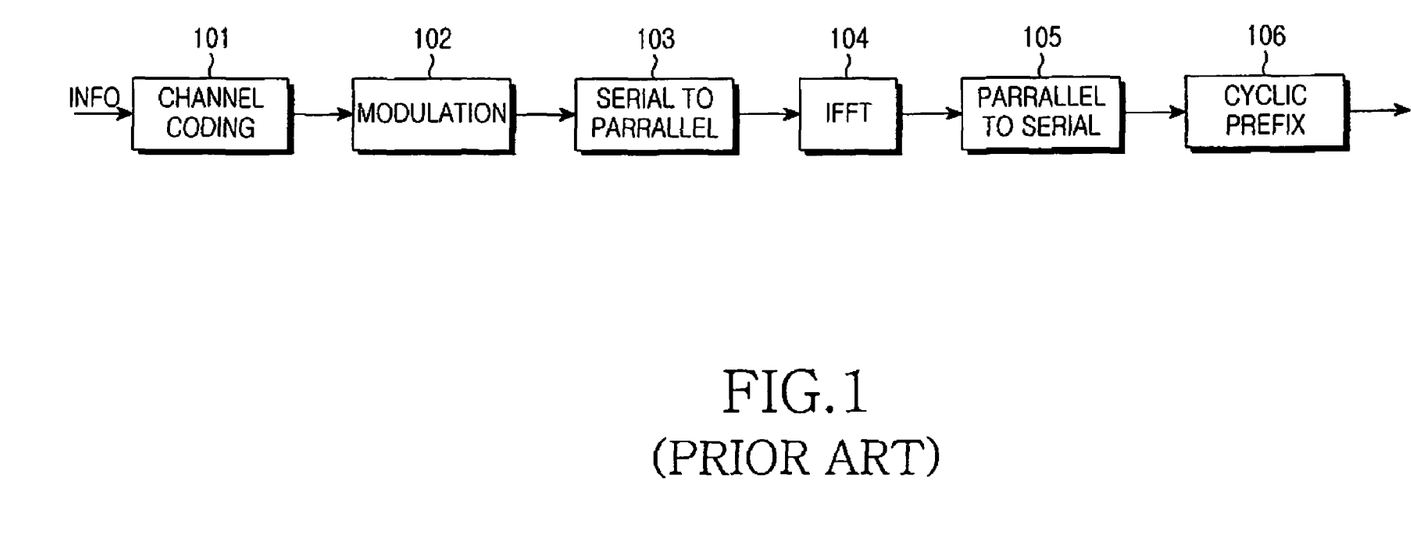
FIG. 1 shows the structure of a transmitter of a conventional OFDM system.

FIG. 1 shows the structure of a transmitter of a conventional OFDM system.

Referring to FIG. 1, the OFDM transmitter includes an encoder 101, a modulator 102, a serial/parallel converter 103, an IFFT block 104, a parallel/serial converter 105, and a CP inserter 106.

The encoder 101, also referred to as a channel encoding block, receives a string of information bits as an input and conducts channel encoding. A convolutional encoder, a turbo encoder, or an LDPC (Low Density Parity Check) encoder is conventionally used as the encoder 101.

The modulator 102 conducts modulation, such as QPSK (Quadrature Phase Shift Keying), 8PSK (Phase Shift Keying), 16QAM (Quadrature Amplitude Modulation), 64QAM, 256QAM, etc.

Those skilled in the art can easily understand that, although not shown in FIG. 1, a rate matching block may be added between the encoder 101 and the modulator 102 to conduct repetition, puncturing, etc.

The serial/parallel converter 103 receives the output of the modulator 102 as an input and converts the signal into a parallel signal.

The IFFT (Inverse Fast Fourier Transform) block 104 receives the output of the serial/parallel converter 103 as an input and conducts IFFT operations. The output of the IFFT block 104 is converted by the parallel/serial converter 105.

The CP inserter 106 inserts a CP (Cyclic Prefix) into the output signal of the parallel/serial converter 105.

In order to transmit packets, the Node B of the OFDMA-type communication system allocates a suitable resource to a UE by means of scheduling. Then, the UE transmits/receives data by using the resource and, according to whether or not the data has errors, retransmits an ACK/NACK signal as a response to the data based on an HARQ (Hybrid Automatic Repeat reQuest). Operations for transmitting packet data by the communication system will now be described with reference to FIG. 2.

Figure 2:
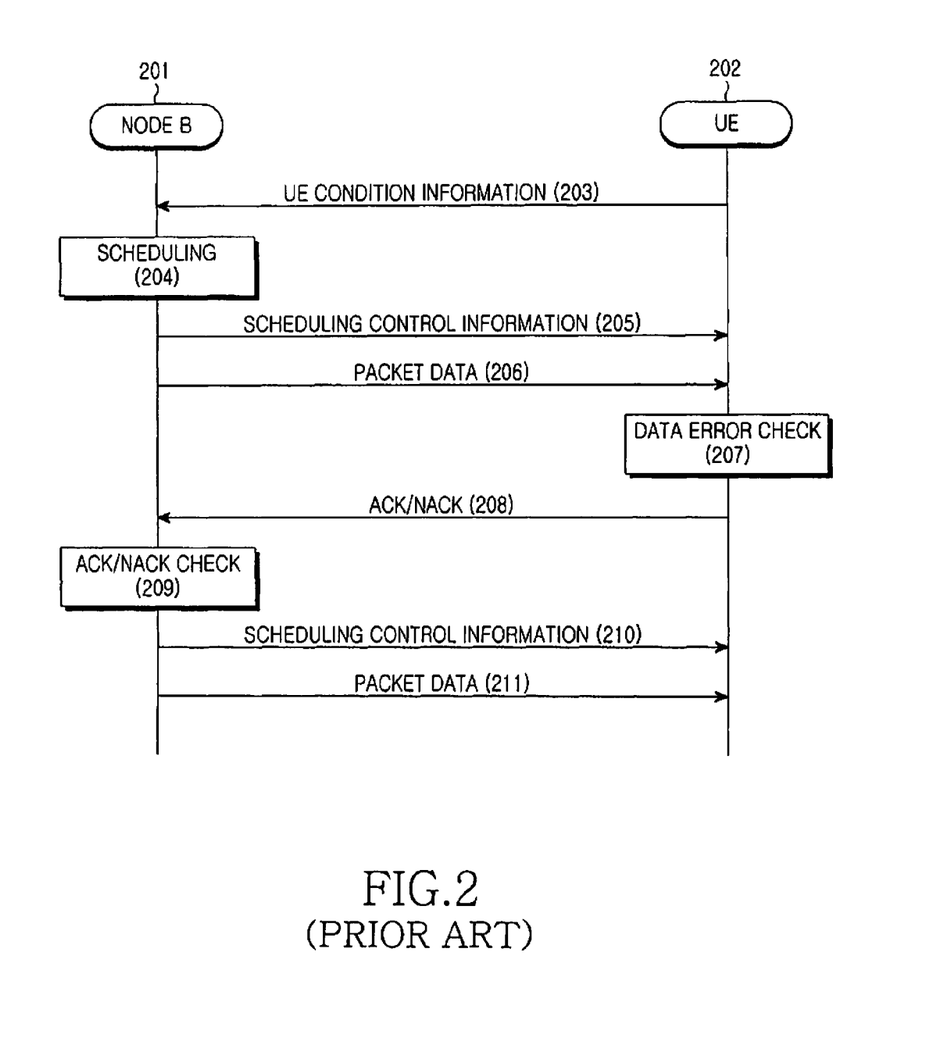
FIG. 2 shows a procedure for transmitting downlink packet data according to the prior art.

FIG. 2 shows a procedure for transmitting downlink packet data.

Referring to FIG. 2, the Node B 201 receives UE condition information, particularly power information, or data buffer information from a plurality of UEs, including a UE 202, in step 203. The Node B 201 schedules UEs belonging to the Node B 201 by using information regarding the condition of the UE 202 in step 204. When a downlink transmission to the UE 202 is determined based on the scheduling, the Node B 201 transmits scheduling control information and packet data to the UE 202 in steps 205 and 206. The scheduling control information refers to information regarding control of the packet data, and may include the construction of wireless resources or data used to transmit the packet data, the transmission scheme, the HARQ information, etc. The scheduling control information is transmitted either concurrently with or prior to the transmission of the packet data. After receiving the scheduling control information and the packet data, the UE 202 decodes the received packet data by using the scheduling control information, and determines if the packet data has been successfully received without errors in step 207. If it is determined in step 207 that the packet data has errors, NACK information is transmitted, and, if no errors have occurred, ACK information is transmitted to the Node B 201 by means of ACK/NACK signaling in step 208. After receiving the ACK/NACK, the Node B 201 evaluates the ACK/NACK in step 209. If an ACK has been transmitted, the transmission of packet data is terminated, and if an NACK has been transmitted, the corresponding packet data is retransmitted in step 211. In this case, control information regarding the retransmitted packet data may be transmitted simultaneously. Alternatively, the scheduling control information may be transmitted prior to the retransmitted packet data as in step 210. The retransmitted packet data includes the same information as the packet data transmitted in step 206, but the transmission type may vary depending on the AMC (Adaptive Modulation and Coding) conducted by the Node B 201.

Figure 3:
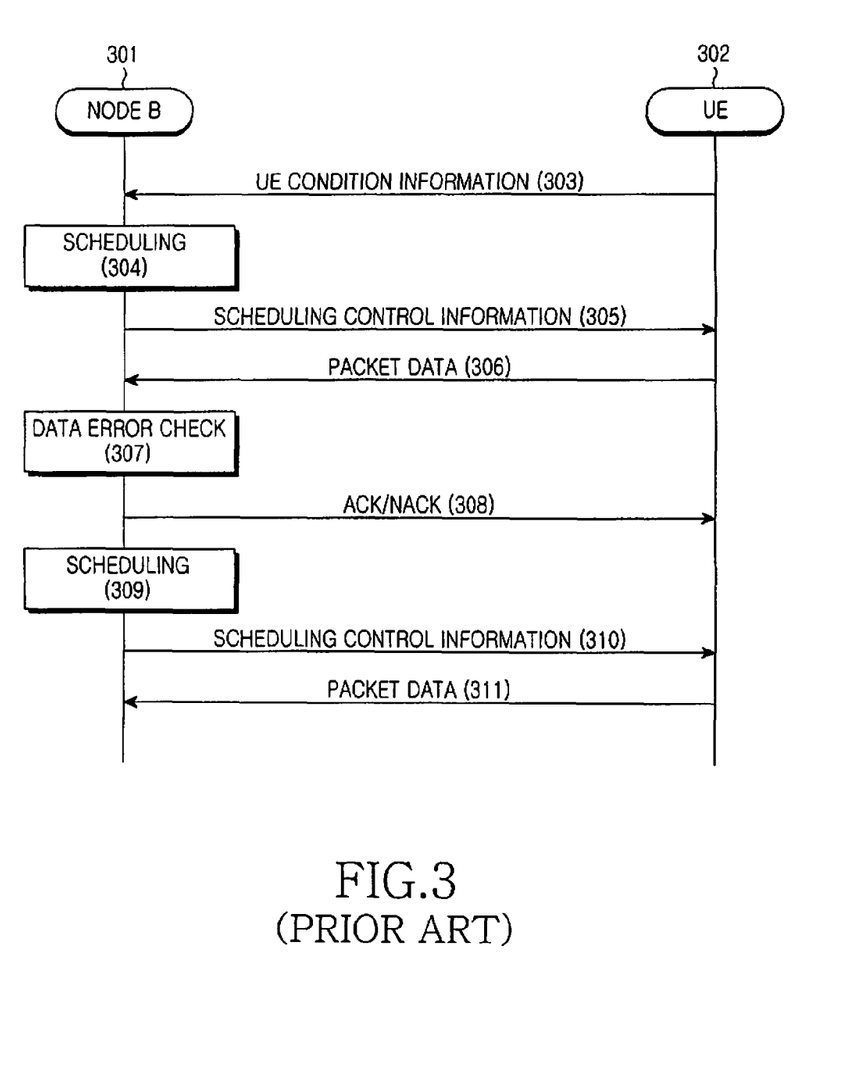
FIG. 3 shows a procedure for transmitting uplink packet data according to the prior art.

FIG. 3 shows a procedure for transmitting uplink packet data.

Referring to FIG. 3, the Node B 301 receives UE condition information, particularly power information, or data buffer information from a plurality of UEs, including a UE 302, in step 303. The Node B 301 schedules UEs belonging to the Node B 301 by using the UE condition information in step 304. When an uplink transmission to the UE 302 is determined based on the scheduling, the Node B 301 transmits scheduling control information to the UE 302 in steps 305. The scheduling control information refers to information regarding control of uplink packet data, the transmission of which to the UE 302 has been allowed, and may include the construction of wireless resources or data used to transmit the uplink packet data, the transmission scheme, the HARQ information, etc. After receiving the scheduling control information, the UE 302 transmits packet data to the Node B 301 by using the transmission scheme and wireless resources, which have been allocated to it based on the scheduling control information, in step 306. After receiving the packet data, the Node B 301 determines if the packet data has been successfully received without errors in step 307. If it is determined in step 307 that the packet data has errors, NACK information is transmitted, and, if no errors have occurred, ACK information is transmitted to the UE 302 by means of ACK/NACK signaling in step 308. After receiving the ACK/NACK, the UE 302 evaluates the ACK/NACK. If an ACK has been transmitted, the transmission of the packet data is terminated, and if an NACK has been transmitted, a retransmission of the packet data is prepared. The Node B 301 reschedules the retransmission of the packet data in step 309, and transmits scheduling control information for the retransmission to the UE 302 in step 310. After receiving the scheduling control information, the UE 302 retransmits packet data to the Node B 301 in step 311. The retransmitted packet data includes the same information as the packet data transmitted in step 306, but the transmission type may vary depending on the AMC conducted by the Node B 301.

A method for multiplexing the ACK/NACK occurring in the process for transmitting downlink or uplink packet data will now be described. In general, the ACK/NACK includes one-bit information or a small amount of information. Therefore, it is preferred in terms of resource efficiency to transmit the ACK/NACK using the smallest amount of resources. However, the characteristics of OFDM systems require that, in order to improve the frequency diversity effect, the ACK/NACK must be distributed over a wide frequency band and then transmitted so as to guarantee the ACK/NACK performance having a high level of error requirements. In the case of a frequency multiplexing method, which solely transmits a signal regarding one UE by using one frequency resource, many frequency resources must be allocated to a single UE in order to transmit a single ACK/NACK. This degrades the resource efficiency. Therefore, an inter-UE code multiplexing method can be used to transmit the ACK/NACK. According to the code multiplexing method, a plurality of UEs share the same resources, but use different codes so that signals can be differentiated among the UEs. The code multiplexing method ensures that all UEs equally have the frequency diversity effect while maintaining a high level of resource efficiency.

A method for multiplexing the ACK/NACK in the downlink and uplink will be described with reference to FIGS. 4 and 5, respectively.

Figure 4:
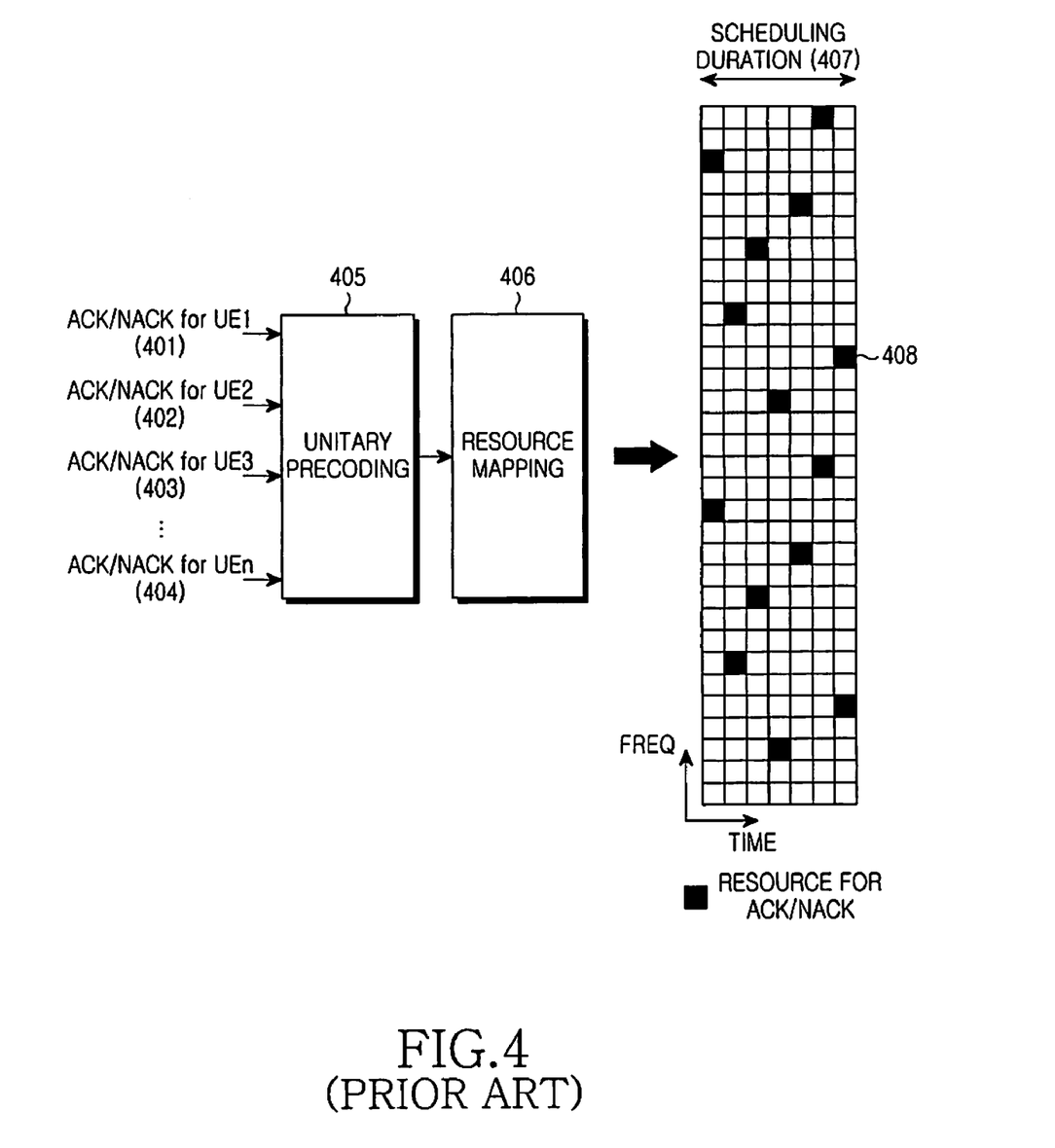
FIG. 4 shows a method for multiplexing a downlink ACK/NACK according to the prior art.

Referring to FIG. 4, the downlink ACK/NACK is characterized in that a single Node B transmits information regarding a number of UEs as a whole. It is assumed in FIG. 4 that the Node B transmits the ACK/NACK with regard to n UEs. The ACK/NACK signals 401-404, which are to be transmitted to the n UEs from the Node B, pass through a unitary precoder 405 so that they are converted into orthogonal codes and are multiplexed. The output of the unitary precoder 405 is inputted to a resource mapper 406 so that it is mapped to time-frequency resources, which are to be used to transmit the multiplexed ACK/NACK signals, and is transmitted to the n UEs. The shaded portions 408 in FIG. 4 correspond to those of the entire time-frequency resources 407, which are used to transmit the ACK/NACK signals. It is clear from FIG. 4 that, when a plurality of UEs share resources 408 during a downlink ACK/NACK transmission, the resource utilization efficiency improves, and all UEs can have frequency diversity gain.

Figure 5:
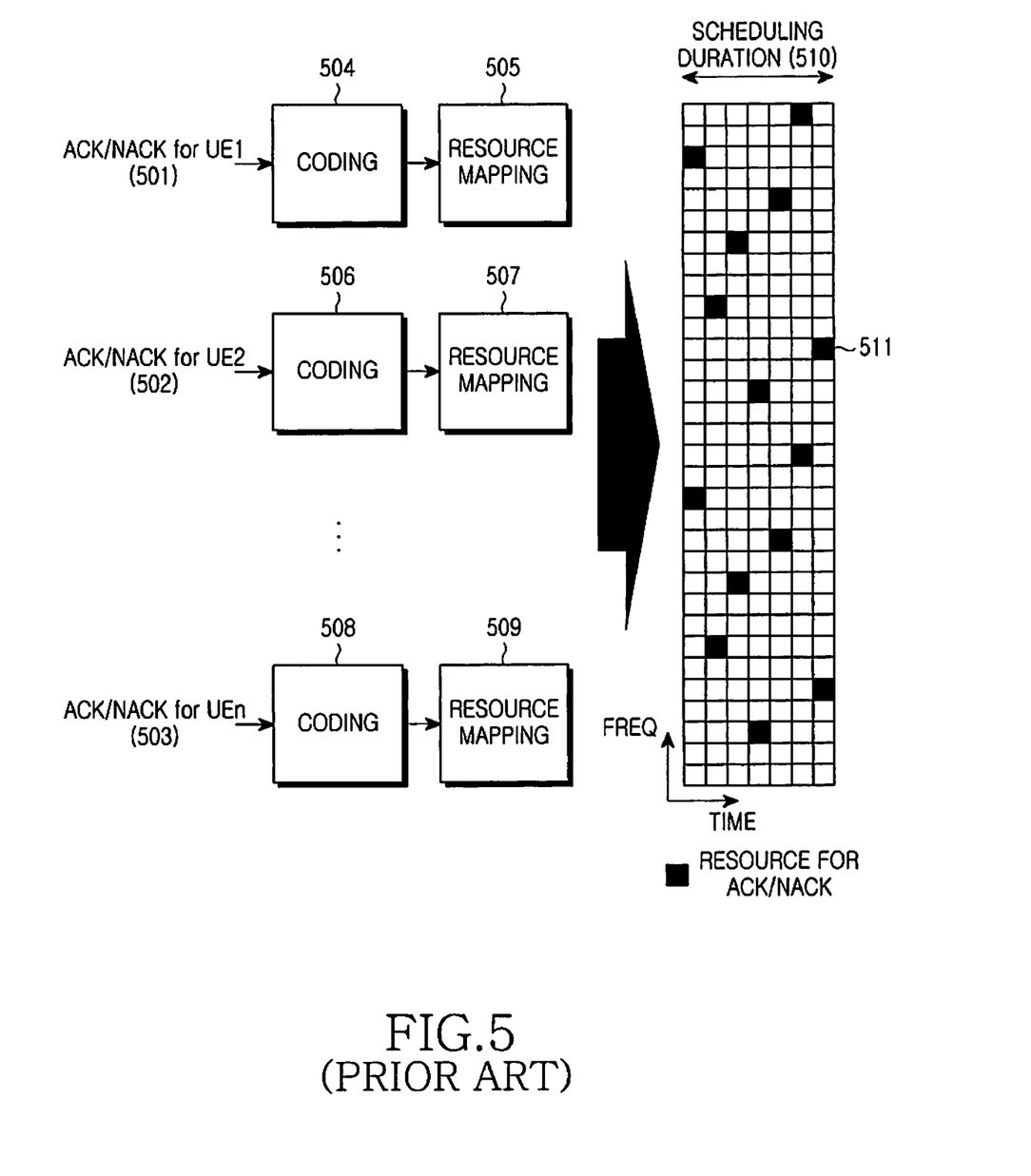
FIG. 5 shows a method for multiplexing an uplink ACK/NACK according to the prior art.

Referring to FIG. 5, the uplink ACK/NACK is characterized in that a single UE transmits a signal to a single Node B. It is assumed in FIG. 5 that each of n UEs transmits its ACK/NACK to a single Node B. The n UEs encode their ACK/NACK signals 501-503 and transmit them by using the same resources. More particularly, the UE 1 encodes an ACK/NACK 501 with an encoder 504, maps it to a resource 511, which has been selected from the entire time-frequency resources 510 in order to transmit the ACK/NACK, by using a resource mapper 505, and transmits the ACK/NACK to the Node B. The UE 2 encodes an ACK/NACK 502 by an encoder 506, maps it to a resource 511, which has been selected from the entire time-frequency resources 510 in order to transmit the ACK/NACK, by using a resource mapper 507, and transmits the ACK/NACK to the Node B. Similarly, the UE n encodes an ACK/NACK 503 by an encoder 508, maps it to a resource 511, which has been selected from the entire time-frequency resources 510 in order to transmit the ACK/NACK, by using a resource mapper 509, and transmits the ACK/NACK to the Node B. The plurality of ACK/NACKs transmitted by the plurality of UEs in FIG. 5 are code-multiplexed, because they are encoded, mapped to the same resources, and transmitted. It is clear from FIG. 5 that, when a plurality of UEs share resources 511 during an uplink ACK/NACK transmission, the resource utilization efficiency improves, and all UEs can have frequency diversity gain.

The conventional method for code-multiplexing the ACK/NACK, which has been described above, is advantageous in terms of resource efficiency and frequency diversity. However, such code multiplexing often fails to perfectly satisfy the orthogonality in the case of a channel having a high level of channel selectivity. Particularly, when the code of each ACK/NACK has a varying degree of receiving power intensity, an ACK/NACK using a code with low receiving power may have very poor receiving performance due to interference with another ACK/NACK using a code having high receiving power.

SUMMARY OF THE INVENTION

Accordingly, the present invention has been made to solve the above-mentioned problems occurring in the prior art, and it is an aspect of the present invention to provide a multiplexing method for solving the problem of orthogonality loss resulting from code-multiplexing of ACK/NACK signals of a plurality of UEs and the accompanying inter-channel interference, as well as a method and an apparatus for allocating ACK/NACK resources by using the same.

In order to accomplish these aspects of the present invention, there is provided a method for multiplexing and transmitting an ACK/NACK as a result of use of an HARQ by a Node B in an OFDMA system, the method including scheduling UEs; grouping the scheduled UEs so that UEs having ACK/NACK transmitting power within a predetermined range belong to an identical group, and setting up scheduling channels for UEs belonging to each group; transmitting scheduling channel signals to the UEs via scheduling channels set up for each UE group; and transmitting ACK/NACKs to respective UEs of a UE group, the ACK/NACKs being supposed to be transmitted to the UE group, in a frequency band for the UE group among frequency bands differently allocated to respective UE groups in accordance with a CDM (Code Division Multiplex) scheme.

In accordance with another aspect of the present invention, there is provided a Node B apparatus for multiplexing and transmitting an ACK/NACK resulting from use of an HARQ in an OFDMA system, the apparatus including a scheduler for scheduling UEs; a scheduling channel creation unit for creating scheduling channel signals regarding the scheduled UEs to be transmitted via scheduling channels; a scheduling channel determination unit for grouping the scheduled UEs so that UEs having ACK/NACK transmitting power within a predetermined range belongs to an identical group, and for setting up scheduling channels for UEs belonging to each group; an ACK/NACK creation unit for determining if data transmitted from the UEs have errors and creating a corresponding ACK/NACK; an ACK/NACK resource setup unit for determining a code used to transmit the created ACK/NACK to each UE belonging to a UE group, the ACK/NACK being supposed to be transmitted to the UE group, in a frequency band for the UE group among frequency bands differently allocated to respective UE groups; and a transmitter for transmitting the ACK/NACK to each UE by using the determined code in the frequency band for the UE group in accordance with a CDM scheme.

In accordance with a further aspect of the present invention, there is provided a method for receiving a multiplexed ACK/NACK as a result of use of an HARQ by a UE in an OFDMA system, the method including receiving a scheduling signal via a scheduling channel allocated from a Node B; and receiving an ACK/NACK corresponding to the scheduling channel among ACK/NACKs transmitted in a frequency band indicated by the scheduling signal in accordance with a CDM scheme.

In accordance with a still further aspect of the present invention, there is provided a UE apparatus for receiving a multiplexed ACK/NACK as a result of use of an HARQ in an OFDMA system, the apparatus including a scheduling channel decision unit for confirming if a scheduling signal has been received via a scheduling channel allocated from a Node B; a receiver for receiving a scheduling signal from the Node B together with an ACK/NACK corresponding to the scheduling channel among ACK/NACKs transmitted in a frequency band indicated by the scheduling signal in accordance with a CDM scheme; a demultiplexer for determining a frequency band and a code for receiving the ACK/NACK, controlling the receiver so as to receive the ACK/NACK by using the determined frequency band and code, and demultiplexing signals received via the receiver; and an ACK/NACK decision unit for deciding whether an ACK/NACK of the demultiplexed signals is an ACK or a NACK.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein is omitted to avoid making the subject matter of the present invention unclear. The terminology used herein is defined based on consideration of relevant functionality according to the present invention, and may vary depending on the intention or practice of the user or operator. Therefore, the definition must be understood based on the overall context of the specification.

In order to solve the problems of the conventional code multiplexing, the present invention provides a frequency-code combined multiplexing method.

As mentioned above, the code multiplexing of ACK/NACK information of a plurality of UEs has a problem that, if it occurs among UEs having a large difference in downlink transmitting power, the ACK/NACK of a UE having low transmitting power may have poor receiving performance due to the interference with another UE having high transmitting power. The transmitting power of the downlink ACK/NACK varies depending on the downlink channel condition of each UE. Particularly, when an ACK/NACK is transmitted to a UE in a bad downlink channel condition, high transmitting power must be used to compensate for the channel condition. In contrast, when an ACK/NACK is transmitted to a UE in a good downlink channel condition, low transmitting power is enough to satisfy the same requirements on transmitting errors. Therefore, the present invention provides that the code multiplexing method be combined with the frequency multiplexing method in order to solve the problems of the conventional code multiplexing method. Particularly, the code multiplexing method is solely applied among UEs having similar ACK/NACK transmitting power, and the frequency multiplexing method is applied among UEs having large differences in the ACK/NACK transmitting power. Such a code-frequency combined multiplexing method can retain the advantages of the code multiplexing method because, when the code multiplexing is applied to at least a predetermined number of UEs, the frequency diversity effect is improved.

Application of the code-frequency combined multiplexing method requires a standard for determining UEs, among which the code multiplexing method is to be employed, as well as UEs, among which the frequency multiplexing method is to be employed. It is to be noted that the frequency multiplexing method includes both time and frequency multiplexing methods, because different time-frequency resources are allocated to respective UEs so that the orthogonality is maintained within a single scheduling time unit.

The standard for classifying the UEs into those due for the frequency multiplexing method and those due for the code multiplexing method will now be described.

When a downlink scheduling channel or an uplink scheduling channel is used in a system based on a multiplexing method according to an embodiment of the present invention, information regarding the scheduling channel is used to indirectly determine ACK/NACK resources. It is assumed in the description of the present invention that, in the system, the scheduling signal itself uses AMC. Based on this assumption, when a UE receives a scheduling channel signal, i.e. when a downlink or uplink packet data transmission is allocated to a UE, the modulation scheme and the encoding rate, i.e. MCS (Modulation and Coding Selection) level, which are used for the scheduling channel transmitted to the UE, adaptively change according to path loss or fading rate, which depends on the downlink channel condition of the UE. A UE in a good channel condition uses a high level modulation scheme and a high encoding rate (e.g. 16QAM or 64QAM) with regard to a downlink or uplink scheduling channel signal. But a UE in a bad channel condition uses a low or plain modulation scheme and a low encoding rate (e.g. QPSK). The channel condition of each UE is determined by the Node B based on a measurement of the UE's performance or a transmission of a CQI (Channel Quality Indicator). The Node B decides a proper level of MCS based on the estimated channel condition, and applies the corresponding modulation scheme and encoding rate to the downlink or uplink scheduling channel signal. As a result, a plurality of UEs that receive scheduling channel signals of the same MCS level setting have similar downlink channel conditions. In summary, the above-mentioned problems of the conventional code multiplexing method can be minimized by applying a code multiplexing method with regard to ACK/NACK signals among a plurality of UEs, which receive scheduling channel signals of the same MCS level setting.

Therefore, the present invention provides that a code multiplexing method is applied among UEs that receive scheduling channel signals having the same MCS level setting, and that a frequency multiplexing method is applied among UEs that receive scheduling channel signals having different MCS level settings.

According to an embodiment of the present invention, either a code multiplexing method or a frequency multiplexing method is applied depending on the MCS level adopted by the scheduling channel. Particularly, the UEs receiving scheduling channel signals at the same MCS level are grouped, and ACK/NACK signals regarding a plurality of groups are differentiated by ACK/NACK resources allocated according to the frequency multiplexing method. Within ACK/NACK resources allocated to a single group, ACK/NACK signals regarding a plurality of UEs belonging to the same group are differentiated by ACK/NACK resources allocated according to the code multiplexing method.

Figure 6:
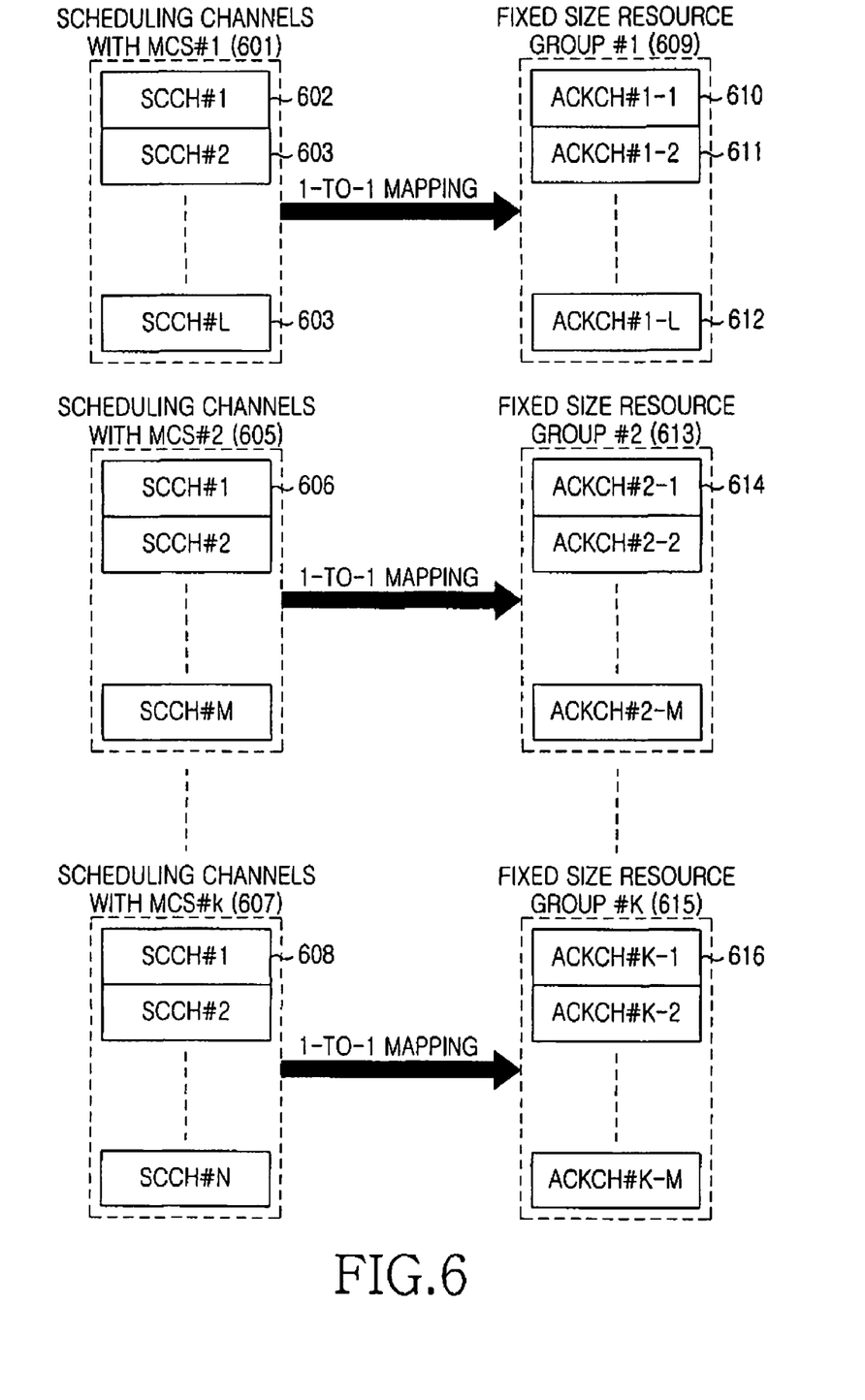
FIG. 6 shows a method for multiplexing an ACK/NACK and a method for allocating a resource to a specific UE according to an embodiment of the present invention.

FIG. 6 shows a method for multiplexing an ACK/NACK and a method for allocating a resource to a specific UE according to an embodiment of the present invention. Although it is assumed in the following description that an ACK/NACK refers to a downlink ACK/NACK, the present invention is similarly applicable to an uplink ACK/NACK.

Referring to FIG. 6, reference numeral 601 corresponds to a group of scheduling channels adopting a predetermined MCS level MCS#1, and the group 601 includes L scheduling channels 602-604. Reference numeral 605 refers to a group of scheduling channels adopting a predetermined MCS level MCS#2, which differs from that of the group 601, and the group 605 includes M scheduling channels 606. Reference numeral 607 corresponds to a group of scheduling channels adopting a predetermined MCS level MCS#k, which differs from those of the groups 601 and 605, and the group 607 includes N scheduling channels 608. Each of the scheduling channel groups 601, 605, and 607 is mapped to an ACK/NACK resource group one by one. Particularly, as shown in FIG. 6, the scheduling channel group 601 is mapped to an ACK/NACK resource group 609, the scheduling channel group 605 is mapped to an ACK/NACK resource group 613, and the scheduling channel group 607 is mapped to an ACK/NACK resource group 615. Respective resource groups 609, 613, and 615 are assigned with predetermined ACK/NACK resources. Particularly, respective ACK/NACK resource groups are assigned with different time-frequency resources so that orthogonality is maintained relative to one another. The Node B and UEs are notified in advance of information regarding the time-frequency resources assigned to respective resource groups and the 1:1 mapping between the scheduling channels and resource groups shown in FIG. 6 by means of upward signaling.

As mentioned above, predetermined time-frequency resources are allocated to respective scheduling channel groups, which adopt different MCS levels, to transmit ACK/NACKs. However, the scheduling channel groups include a plurality of scheduling channel signals for a plurality of UEs. Therefore, the resources allocated to the scheduling channel groups must be reclassified into resources for the ACK/NACK of each UE.

An ACK/NACK resource allocated to each UE in the same ACK/NACK resource group is identified by a code for CDM. ACK/NACK resources used by UEs indicated by the scheduling channels 602-604, which belong to the scheduling channel group 601 adopting the MCS level 1 MCS#1, are mapped to ACK/NACK codes 610-612 belonging to the ACK/NACK resource group 609. More particularly, a UE indicated by the scheduling channel 602 transmits ACK/NACK information to the Node B by means of a time-frequency resource allocated to the ACK/NACK resource group 609 according to the ACK/NACK code 610. In addition, a UE indicated by the scheduling channel signal 603 transmits ACK/NACK information to the Node B by means of a time-frequency resource allocated to the ACK/NACK resource group 609 according to the ACK/NACK code 611. Finally, a UE indicated by the scheduling channel signal 604 transmit ACK/NACK information by means of a time-frequency resource allocated to the ACK/NACK resource group 609 according to the ACK/NACK code 612. Similarly, a UE indicated by the scheduling channel signal 606 adopting the MCS level 2 MCS#2 transmits ACK/NACK information by means of a time-frequency resource allocated to the ACK/NACK resource group 613 according to the ACK/NACK code 614, and a UE indicated by the scheduling channel signal 608 adopting the MCS level k MCS#k transmits ACK/NACK information by means of a time-frequency resource allocated to the ACK/NACK resource group 615 according to the ACK/NACK code 616.

Figure 7:
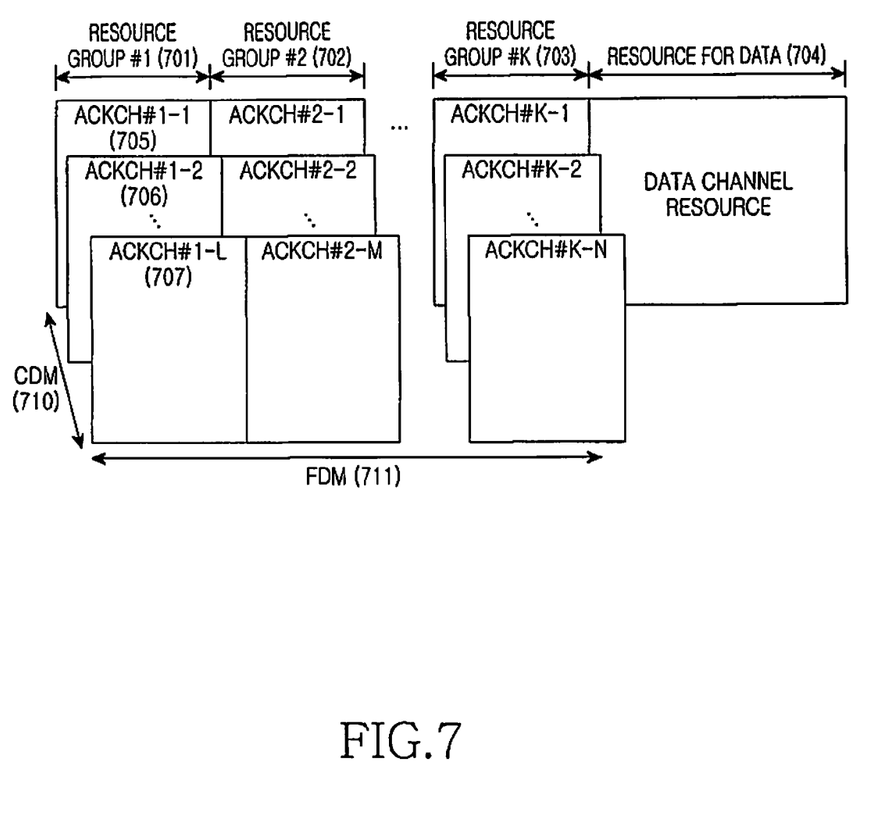
FIG. 7 shows the mapping of ACK/NACK resources to UEs according to an embodiment of the present invention.

FIG. 7 shows the mapping of ACK/NACK resources to UEs receiving scheduling channels in terms of resources.

Referring to FIG. 7, reference numerals 701-703 correspond to ACK/NACK resource groups used to transmit ACK/NACKs, and the remaining resource 704 is used for packet data channels or other control channels. ACK/NACK channels inside each ACK/NACK resource group are code-multiplexed. In other words, ACK/NACK channels 705-707 in the ACK/NACK resource group 701 are code-multiplexed as indicated by reference numeral 710. Frequency multiplexing is applied between the ACK/NACK resource groups. Different time-frequency resources are allocated to the ACK/NACK resource groups 701, 702, and 703 so that orthogonality is maintained relative to one another.

Figure 8:
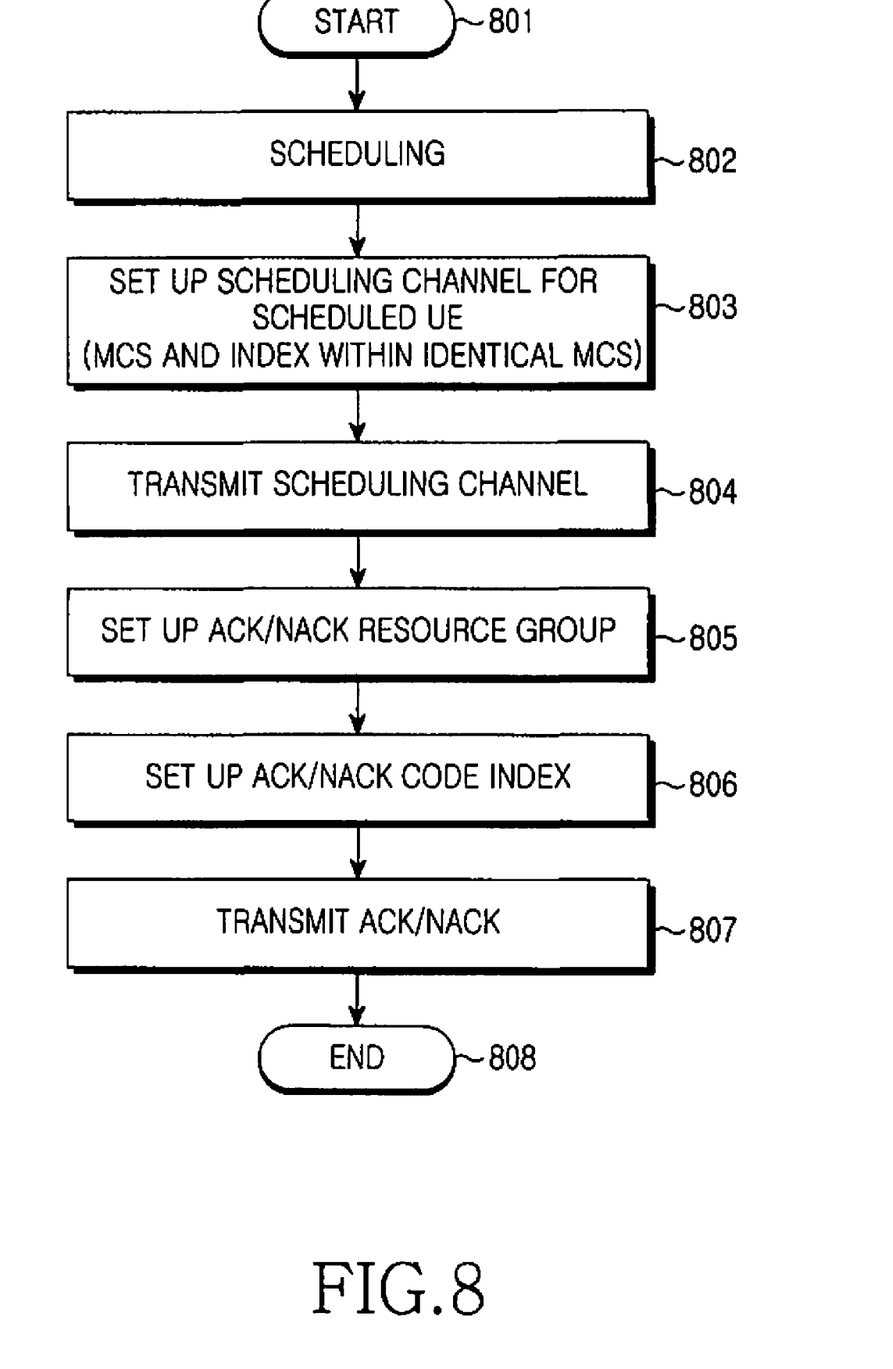
FIG. 8 shows the operation of a Node B according to an embodiment of the present invention.

FIG. 8 shows a procedure for transmitting an ACK/NACK by a Node B transmitting apparatus in order to apply a multiplexing method according to an embodiment of the present invention.

Referring to FIG. 8, the Node B begins the procedure in step 801, and schedules a UE in step 802. A scheduling channel is set up in step 803 with regard to the scheduled UE. To this end, an index is set up with regard to a scheduling channel within a scheduling channel group, which adopts the same MCS level as the scheduling channel. A scheduling signal is transmitted to the UE via the scheduling channel, to which the index has been assigned, in step 804. The Node B sets up an ACK/NACK resource group in step 805. As mentioned above, the UE and the Node B are already informed of the mapping between the ACK/NACK resource group and the scheduling channel group by means of upward signaling. Therefore, the Node B determines an ACK/NACK resource group mapped to the scheduling channel, to which the index has been assigned, according to the mapping information, and selects a time-frequency resource, which is to be used to transmit an ACK/NACK to the UE, from the time-frequency resources belonging to the determined resource group. The Node B sets up a code index for the ACK/NACK of the UE in step 806. The code index is set up to be identical to the index of the scheduling channel set up in step 803. The Node B transmits an ACK/NACK for the UE according to a suitable HARQ operation in step 807, and finishes transmitting the ACK/NACK in step 808.

Figure 9:
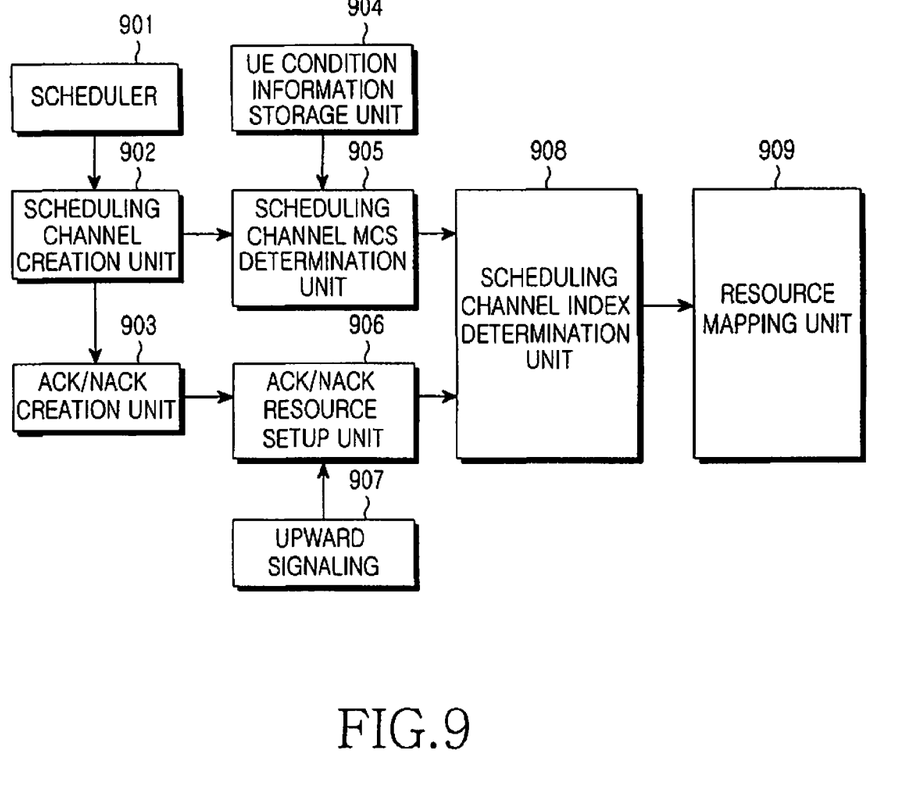
FIG. 9 shows the structure of a Node B according to an embodiment of the present invention.

FIG. 9 shows the structure of a Node B transmitting apparatus according to an embodiment of the present invention.

Referring to FIG. 9, the Node B selects a scheduled UE with a scheduler 901, and a scheduling channel creation unit 902 creates a scheduling channel signal containing scheduling information regarding the UE. A scheduling channel MCS determination unit 905 receives information regarding the condition of the scheduled UE from a UE condition information storage unit 904 as an input, and determines the MCS level regarding the scheduling channel signal. A scheduling channel index determination unit 908 determines a scheduling channel index, which is to be used to transmit a scheduling channel signal regarding the UE among a plurality of scheduling channel signals simultaneously transmitted at the determined MCS level. A resource mapping unit 909 multiplexes the scheduling channel signal with other scheduling channel signals and maps it to a predetermined resource. In contrast, the ACK/NACK regarding the UE, which receives the scheduling channel signal, is transmitted later than the scheduling channel signal for the purpose of an HARQ operation. In other words, the ACK/NACK is transmitted after the Node B receives data from the UE, which has received the scheduling channel signal, and determines if the data has errors. Therefore, the ACK/NACK information is created by an ACK/NACK creation unit 903 of the Node B apparatus according to the HARQ operation, and the created ACK/NACK information is mapped to a predetermined resource by an ACK/NACK resource setup unit 906. The ACK/NACK resource setup unit 906 determines ACK/NACK resource group information and a code index to be used inside the ACK/NACK resource group by using information regarding the MCS level of the corresponding scheduling channel signal determined by the scheduling channel MCS setup unit 905 and information regarding the index of the corresponding scheduling channel determined by the scheduling channel index determination unit 908. The resource information determined by the ACK/NACK resource setup unit 906 is mapped to a corresponding ACK/NACK resource by the resource mapping unit 909 by using upward signaling 907 to determine a time-frequency resource corresponding to the determined ACK/NACK resource group and by using the determined ACK/NACK code index. A transmitter (not shown) transmits the ACK/NACK information, which has been created by the ACK/NACK creation unit 903, by using the resource determined by the ACK/NACK resource setup unit 906.

Figure 10:
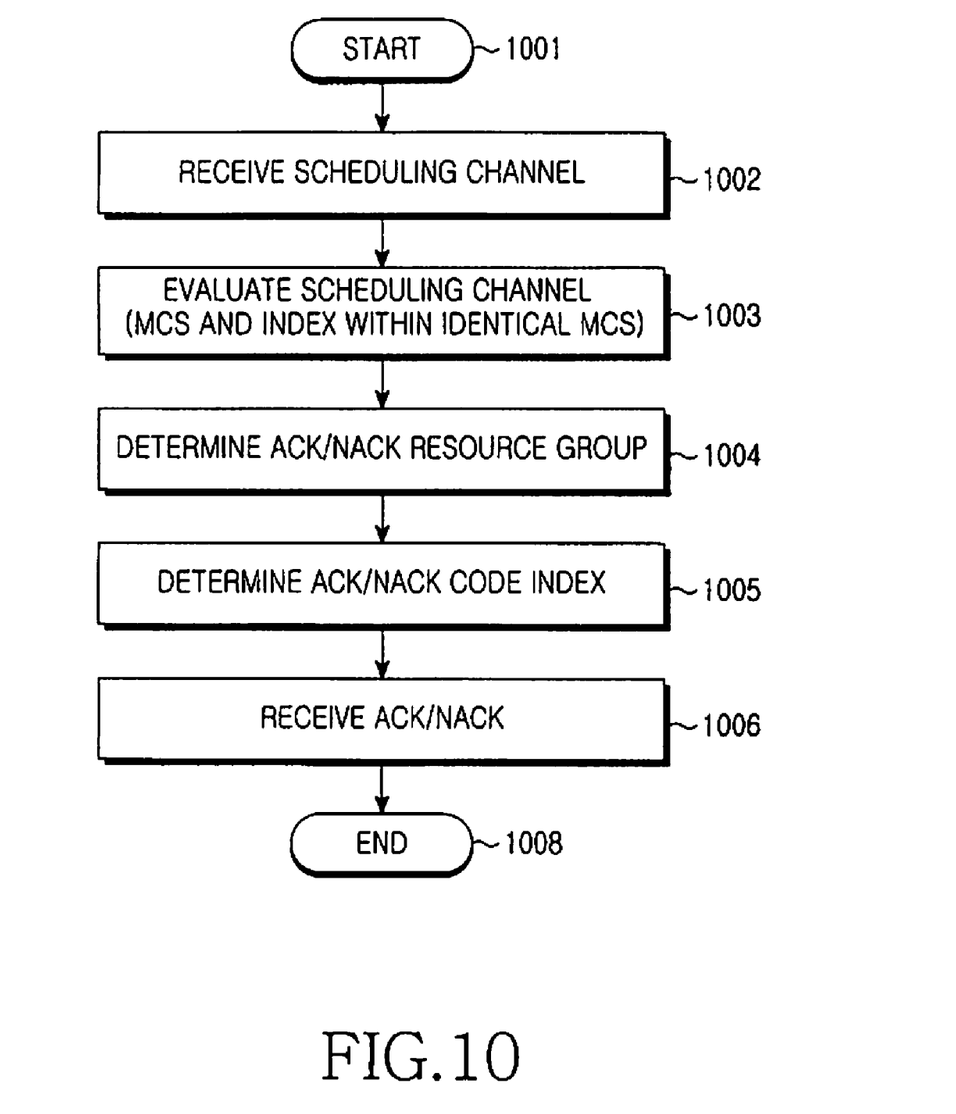
FIG. 10 shows the operation of a UE according to an embodiment of the present invention.

FIG. 10 shows a procedure for receiving an ACK/NACK by a UE receiving apparatus according to an embodiment of the present invention.

Referring to FIG. 10, the UE starts the receiving procedure in step 1001, and receives a scheduling channel signal in step 1002. The UE evaluates the received scheduling channel signal in step 1003. Particularly, the UE searches for every possible scheduling channel by means of blind decoding and determines if a scheduling channel signal matching with its ID has arrived. If its scheduling channel signal has arrived, the UE obtains the MCS level adopted by the scheduling channel signal and information regarding the index of the corresponding scheduling channel. The UE determines an ACK/NACK resource group, which uses an ACK/NACK, from the obtained MCS level according to pre-signaled mapping information in step 1004. The UE determines the code index of the ACK/NACK as identical to the index of the scheduling channel index in step 1005. The UE receives an ACK/NACK from the Node B by using the determined ACK/NACK resource group and the ACK/NACK code index in step 1006, and finishes the receiving procedure in step 1007.

Figure 11:
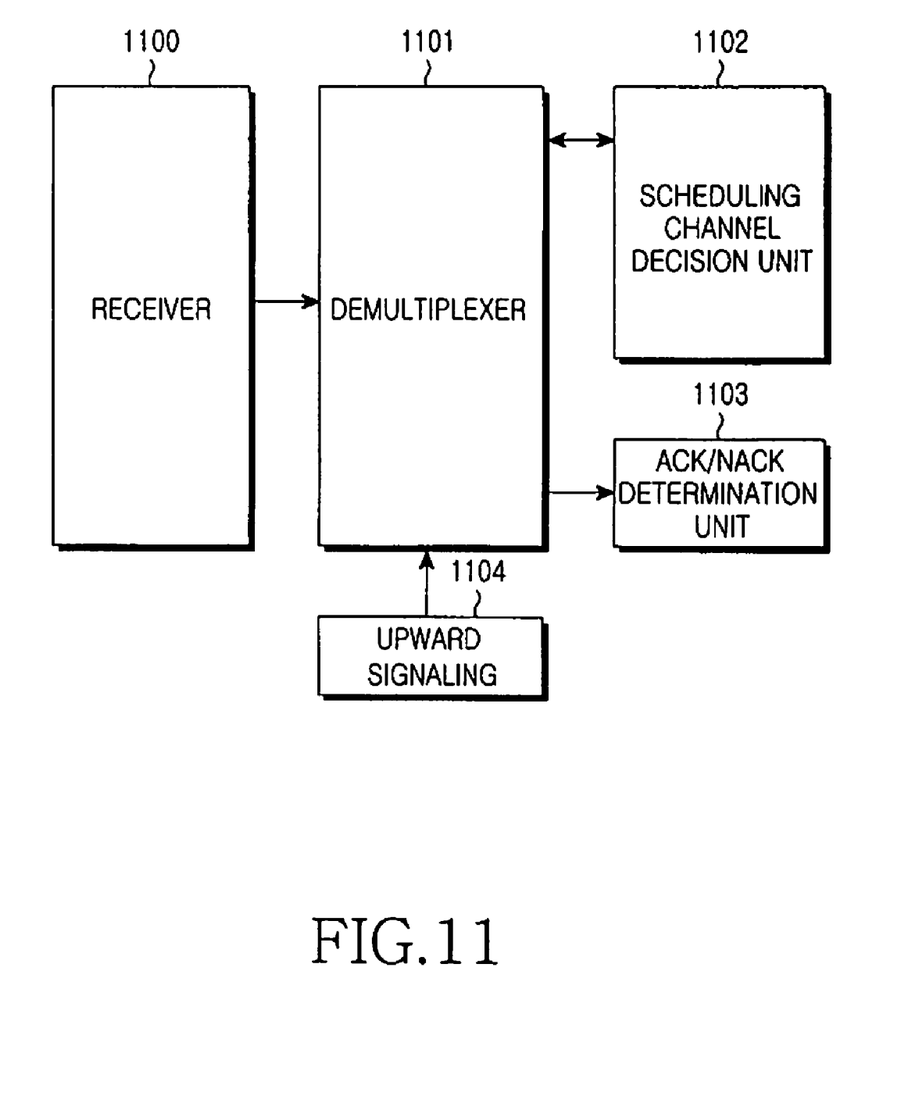
FIG. 11 shows the structure of a UE according to an embodiment of the present invention

FIG. 11 shows the structure of a UE receiving apparatus according to an embodiment of the present invention.

Referring to FIG. 11, the UE receives scheduling channel signals and an ACK/NACK signal from the Node B via a receiver 1100. A demultiplexer 1101 demultiplexes the scheduling channel signals and ACK/NACK signal. A scheduling channel decision unit 1102 decides if the received scheduling channel signals include a scheduling channel signal for the UE. When the scheduling channel decision unit 1102 confirms that a scheduling channel signal for the UE has arrived, a scheduling channel decision unit 1102 checks the MCS level of the scheduling channel regarding the scheduling signal arrived and the scheduling channel index. The information regarding the MCS level and index of the scheduling channel checked by the scheduling channel decision unit 1102 is again inputted to the demultiplexer 1101, which then determines an ACK/NACK resource group for an ACK/NACK and an ACK/NACK code index based on the inputted information and upward signaling information 1104. An ACK/NACK determination unit 1103 extracts an ACK/NACK signal from the signals received by the receiver unit 1100 by using the ACK/NACK resource determined by the demultiplexer 1101, and determines whether the extracted ACK/NACK signal is an ACK signal or an NACK signal. The point of time at which the ACK/NACK signal is received depends on when the scheduling channel signal is received, but, for the purpose of an HARQ operation, it comes after the scheduling channel signal is received and then a predetermined period of time has elapsed. The time delay may be decided based on determination and demultiplexing by the demultiplexer 1101.

The present invention applies a frequency-code combined multiplexing method when ACK/NACK resources are allocated in an OFDMA communication system. The present invention enables the Node B and the UEs to share information regarding the ACK/NACK resources without signaling overhead. In addition, advantages of both frequency and code multiplexing methods are obtained during the ACK/NACK transmission, i.e. the resource utilization efficiency and frequency diversity gain are improved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for multiplexing and transmitting an ACKnowledgment/Negative ACKnowledgment (ACK/NACK) as a result of use of a Hybrid Automatic Repeat reQuest (HARQ) scheme by a Node B in an Orthogonal Frequency Division Multiple Access (OFDMA) system, the method comprising the steps of:

scheduling User Equipments (UEs);

grouping the scheduled UEs so that UEs having ACK/NACK transmitting power within a predetermined range belong to one group, and setting up scheduling channels for each UE group;

transmitting scheduling channel signals to the UEs via scheduling channels set up for each UE group; and transmitting ACK/NACKs to respective UEs of a UE group, the ACK/NACKs being transmitted to the UE group, in a frequency band for the UE group among frequency bands differently allocated to respective UE groups, in accordance with a CDM (Code Division Multiplex) scheme, wherein a code index of an ACK/NACK transmitted in the frequency band is set up to be identical to an index of the scheduling channels set up for UEs belonging to the one UE group.

2. The method as claimed in claim 1, wherein the scheduling channels set up for UEs belonging to the one group are set up so as to have a Modulation and Coding Selection (MCS) level within a predetermined range.

3. A Node B apparatus for multiplexing and transmitting an ACK/NACK resulting from use of an HARQ in an OFDMA system, the apparatus comprising:
a scheduler for scheduling UEs;
a scheduling channel creation unit for creating scheduling channel signals regarding the scheduled UEs to be transmitted via scheduling channels;
a scheduling channel determination unit for grouping the scheduled UEs so that UEs having ACK/NACK transmitting power within a predetermined range belong to one group, and for setting up scheduling channels for UEs belonging to each group;
an ACK/NACK creation unit for determining if data transmitted from the UEs have errors and creating a corresponding ACK/NACK;
an ACK/NACK resource setup unit for determining a code used to transmit the created ACK/NACK to each UE belonging to a UE group, the ACK/NACK being transmitted to the UE group, in a frequency band for the UE group among frequency bands differently allocated to respective UE groups, wherein the ACK/NACK resource setup unit is adapted to set up a code index of an ACK/NACK transmitted in the frequency band to be identical to an index of the scheduling channels set up for UEs belonging to the one UE group; and
a transmitter for transmitting the ACK/NACK to each UE by using the determined code in the frequency band for the UE group in accordance with a CDM scheme.

4. The apparatus as claimed in claim 3, wherein the scheduling channel determination unit comprises:
a scheduling channel MCS determination unit for setting up the scheduling channels so as to have an MCS level within a predetermined range, the scheduling channels having been set for UEs belonging to the one group; and
a scheduling channel index determination unit for determining an index of each scheduling channel belonging to a scheduling channel group of scheduling channels having an MCS level set up within the predetermined range.

5. A method for receiving a multiplexed ACK/NACK as a result of use of an HARQ by a UE in an OFDMA system, the method comprising the steps of:
receiving a scheduling signal via a scheduling channel allocated from a Node B; and
receiving an ACK/NACK corresponding to the scheduling channel among ACK/NACKs transmitted in a frequency band indicated by the scheduling signal in accordance with a CDM scheme, wherein the received ACK/NACK has a code index set up to be identical to an index of the scheduling channel.

6. The method as claimed in claim 5, wherein the scheduling channel is allocated to UEs, the scheduling channel having been set up so that an MCS level is in a predetermined range, transmitting power of an ACK/NACK transmitted from the Node B to the UEs being in a predetermined range.

7. A UE apparatus for receiving a multiplexed ACK/NACK as a result of use of an HARQ in an OFDMA system, the apparatus comprising:
a scheduling channel decision unit for confirming if a scheduling signal has been received via a scheduling channel allocated from a Node B;
a receiver for receiving a scheduling signal from the Node B together with an ACK/NACK corresponding to the scheduling channel among ACK/NACKs transmitted in a frequency band indicated by the scheduling signal in accordance with a CDM scheme, wherein the receiver is adapted to receive an ACK/NACK having a code index identical to a channel index decided by the scheduling channel decision unit under control of the demultiplexer;
a demultiplexer for determining a frequency band and a code for receiving the ACK/NACK, controlling the receiver so as to receive the ACK/NACK by using the determined frequency band and code, and demultiplexing signals received via the receiver; and
an ACK/NACK decision unit for deciding whether an ACK/NACK of the demultiplexed signals is an ACK or a NACK.

8. The apparatus as claimed in claim 7, wherein the scheduling channel is allocated to UEs, the scheduling channel having been set up so that an MCS level is in a predetermined range, transmitting power of an ACK/NACK transmitted from the Node B to the UEs being in a predetermined range, and the scheduling channel decision unit is adapted to decide an MCS level of the scheduling channel corresponding to the received scheduling signal and an index of the scheduling channel and to transmit the MCS level and the index to the demultiplexer.

* * * * *